United States Patent
Okano et al.

(10) Patent No.: US 12,448,979 B2
(45) Date of Patent: Oct. 21, 2025

(54) ELECTRIC TURBO COMPRESSOR

(71) Applicant: KABUSHIKI KAISHA TOYOTA JIDOSHOKKI, Kariya (JP)

(72) Inventors: Yuki Okano, Kariya (JP); Hiroshi Saito, Kariya (JP); Yuki Endo, Kariya (JP); Arata Ioki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 50 days.

(21) Appl. No.: 18/693,266

(22) PCT Filed: Mar. 15, 2022

(86) PCT No.: PCT/JP2022/011620
§ 371 (c)(1),
(2) Date: Mar. 19, 2024

(87) PCT Pub. No.: WO2023/047652
PCT Pub. Date: Mar. 30, 2023

(65) Prior Publication Data
US 2025/0003414 A1   Jan. 2, 2025

(30) Foreign Application Priority Data
Sep. 24, 2021   (JP) ................. 2021-155714

(51) Int. Cl.
*F04D 25/06* (2006.01)
*F04D 17/10* (2006.01)
(Continued)

(52) U.S. Cl.
CPC ............. *F04D 25/06* (2013.01); *F04D 17/10* (2013.01); *F04D 29/053* (2013.01);
(Continued)

(58) Field of Classification Search
CPC ...... F04D 17/02; F04D 17/122; F04D 29/053; F04D 29/286; F05D 2300/522
See application file for complete search history.

(56) References Cited

U.S. PATENT DOCUMENTS 5,363,674 A * 11/1994 Powell ................. F04D 17/122
62/505
2015/0267707 A1 * 9/2015 Hoshino ................. H02K 9/12
417/244
2018/0283402 A1   10/2018 Maeda et al.

FOREIGN PATENT DOCUMENTS

JP        8-509802 A    10/1996
JP     2014-169704 A     9/2014
(Continued)

OTHER PUBLICATIONS

International Search Report for PCT/JP2022/011620 dated May 10, 2022.

*Primary Examiner* — Kenneth J Hansen
(74) *Attorney, Agent, or Firm* — Sughrue Mion, PLLC

(57) ABSTRACT

An electric turbo compressor including a housing, an electric motor, and a rotating body driven to rotate by the electric motor. The rotating body includes a rotary shaft, a first impeller, and a second impeller. The first impeller includes a first hub fixed to the rotary shaft, and a plurality of first blades arranged on the first hub, and the second impeller includes a second hub fixed to the rotary shaft, and a plurality of second blades arranged on the second hub. In the rotating body, mass of part of the rotating body from one ends to the other ends of the first blades along the axial direction is greater than mass of part of the rotating body from one ends to the other ends of the second blades along the axial direction.

8 Claims, 3 Drawing Sheets

(51) Int. Cl.
    *F04D 29/053* (2006.01)
    *F04D 29/28* (2006.01)
    *F04D 29/42* (2006.01)
(52) U.S. Cl.
    CPC ......... *F04D 29/284* (2013.01); *F04D 29/286* (2013.01); *F04D 29/4206* (2013.01); *F05D 2300/522* (2013.01)

(56) References Cited

FOREIGN PATENT DOCUMENTS

| | | |
|---|---|---|
| JP | 2015-194151 A | 11/2015 |
| JP | WO2017/094161 A1 | 6/2017 |

* cited by examiner

ELECTRIC TURBO COMPRESSOR

CROSS-REFERENCE TO RELATED APPLICATIONS

This application is a National Stage of International Application No. PCT/JP2022/011620 filed Mar. 15, 2022, claiming priority based on Japanese Patent Application No. 2021-155714 filed Sep. 24, 2021, the contents of all of which are incorporated herein by reference in their entirety.

TECHNICAL FIELD

The present disclosure relates to an electric turbo compressor.

BACKGROUND ART

A conventional electric turbo compressor is disclosed in the Japanese Patent Application Publication No. 2015-194151 (Patent Document 1), for example. The electric turbo compressor has a rotary shaft that is driven to rotate, and a first impeller and a second impeller mounted on the rotary shaft. An impeller chamber is formed in a housing, and the first impeller and the second impeller are accommodated in the impeller chamber.

CITATION LIST

Patent Document

Patent Document 1: Japanese Patent Application Publication No. 2015-194151

SUMMARY OF INVENTION

Technical Problem

There is a demand for greater reliability for electric turbo compressors. The present disclosure proposes an electric turbo compressor that can improve reliability.

Solution to Problem

Accordance to the present disclosure, an electric turbo compressor including a housing, an electric motor accommodated in the housing, and a rotating body accommodated in the housing and driven to rotate by the electric motor is proposed. The rotating body includes a rotary shaft that rotates together with the electric motor, a first impeller that rotates together with the rotating shaft, and a second impeller that rotates together with the rotary shaft. The electric motor, the first impeller, the second impeller are arranged in this order in an axial direction of the rotary shaft. The first impeller rotates to compress gas. The second impeller rotates to compress the gas compressed by the first impeller. The first impeller includes a first hub fixed to the rotary shaft, and a plurality of first blades arranged on the first hub. The second impeller includes a second hub fixed to the rotary shaft, and a plurality of second blades arranged on the second hub. In the rotating body, mass of part of the rotating body from one ends of the first blades to the other ends of the first blades along the axial direction is greater than mass of part of the rotating body from one ends of the second blades to the other ends of the second blades along the axial direction.

In such a rotating body, by setting the mass of the rotating body at two positions on the shaft tip end side where impellers relatively large in weight are disposed, an amount of runout of the second impeller may be reduced and contact between the second impeller and the housing may be suppressed, so that the reliability of the electric turbo compressor may be improved. In addition, since turbulence in a flow of refrigerant may be suppressed, the electric turbo compressor can perform efficient two stage compression.

In the above electric turbo compressor, in the rotating body, mass of part of the rotating body from one end of the first hub to the other end of the first hub along the axial direction may be greater than mass of part of the rotating body from one end of the second hub to the other ends of the second hub along the axial direction. In this way, the amount of the runout of the second impeller can be reliably reduced.

In the above electric turbo compressor, mass of the first impeller may be greater than mass of the second impeller. With this configuration, in the rotating body, the mass of the part of the rotating body from the one ends of the first blades to the other ends of the first blades along the axial direction may be easily made greater than the mass of the part of the rotating body from the one ends of the second blades to the other ends of the second blades along the axial direction.

In the above electric turbo compressor, an outer diameter of the first impeller may be greater than an outer diameter of the second impeller. With this configuration, in the rotating body, the mass of the part of the rotating body from the one ends of the first blades to the other ends of the first blades along the axial direction may be easily made greater than the mass of the part of the rotating body from the one ends of the second blades to the other ends of the second blades along the axial direction.

In the above electric turbo compressor, the overall length of the first impeller along the axial direction may be greater than the overall length of the second impeller along the axial direction. With this configuration, in the rotating body, the mass of the part of the rotating body from the one ends of the first blades to the other ends of the first blades along the axial direction may be easily made greater than the mass of the part of the rotating body from the one ends of the second blades to the other ends of the second blades along the axial direction.

In the above electric turbo compressor, specific gravity of a material of the first impeller may be greater than specific gravity of a material of the second impeller. With this configuration, in the rotating body, the mass of the part of the rotating body from the one ends of the first blades to the other ends of the first blades along the axial direction may be easily made greater than the mass of the part of the rotating body from the one ends of the second blades to the other ends of the second blades along the axial direction.

In the above electric turbo compressor, in the rotating body, the mass of the part of the rotating body from the one ends of the second blades to the other ends of the second blades along the axial direction may be greater than mass of part of the rotating body from the second blades to one end of the rotary shaft on a side on which the second impeller is disposed. By setting the mass of the rotating body in this way, the amount of the runout of the rotating body may be further reduced.

In the above electric turbo compressor, in the rotating body, the mass of part of the rotating body from the one ends of the first blades to the other ends of the first blades along the axial direction may be greater than mass of part of the rotating body from the first blades to the second blades along the axial direction. By setting the mass of the rotating body in this way, the amount of the runout of the rotating body may be further reduced.

Advantageous Effects of Invention

According to the electric turbo compressor of the present disclosure, reliability can be improved.

DESCRIPTION OF EMBODIMENTS

Figure 1:
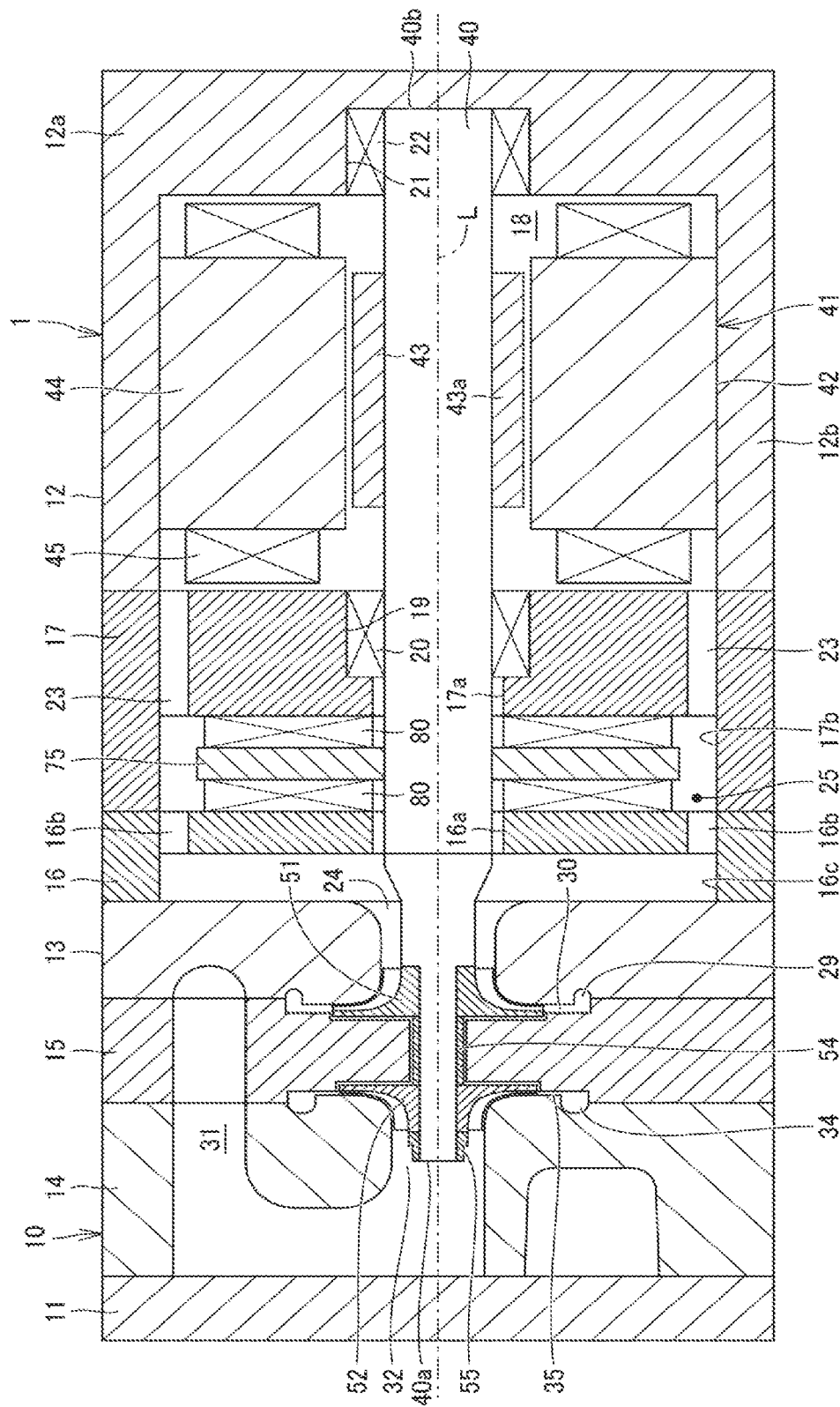
FIG. 1 is a cross-sectional side view of an electric turbo compressor according to an embodiment.

Hereinafter, an embodiment will be described in detail with reference to the drawings. In the following description, identical parts are designated with the same reference numerals and characters. Names and functions for these parts are the same. Therefore, the detailed descriptions thereof will not be repeated.

An electric turbo compressor of the embodiment is used, for example, for an air conditioner. Fluid to be compressed by the electric turbo compressor is refrigerant circulating in a refrigeration cycle. FIG. 1 is a cross-sectional side view of an electric turbo compressor 1 according to the embodiment.

As illustrated in FIG. 1, the electric turbo compressor 1 includes a housing 10 having a tubular shape. The housing 10 includes a rear housing 11, a motor housing 12, a first compressor housing 13, a second compressor housing 14, a partition wall 15, a first intermediate housing 16, and a second intermediate housing 17. The rear housing 11, the motor housing 12, the first compressor housing 13, the second compressor housing 14, the partition wall 15, the first intermediate housing 16, and the second intermediate housing 17 are each made of metal material, for example, aluminum.

The motor housing 12 has a bottomed tubular shape, and includes an end wall 12a having a plate shape and a peripheral wall 12b extending in a tubular shape from an outer periphery of the end wall 12a. The second intermediate housing 17 is connected to the motor housing 12 with an opening in the peripheral wall 12b opposite from the end wall 12a closed by the second intermediate housing 17. A motor chamber 18 is defined by the end wall 12a, the peripheral wall 12b of the motor housing 12, and the second intermediate housing 17. The motor housing 12 has an inlet hole (not illustrated) through which refrigerant is introduced. The inlet hole is in communication with the motor chamber 18. Thus, refrigerant is introduced into the motor chamber 18 through the inlet hole.

A shaft insertion hole 17a having a circular hole shape is formed in a central portion of the second intermediate housing 17. The second intermediate housing 17 has a first bearing holder 19 having a cylindrical shape. The first bearing holder 19 is formed in an inner peripheral surface of the second intermediate housing 17. An inside of the first bearing holder 19 is in communication with the shaft insertion hole 17a. A central axis of the first bearing holder 19 and a central axis of the shaft insertion hole 17a coincide with each other. A first radial bearing 20 is held by the first bearing holder 19.

The end wall 12a of the motor housing 12 has a second bearing holder 21 having a cylindrical shape. The second bearing holder 21 is formed in a central portion of the end wall 12a of the motor housing 12. A central axis of the first bearing holder 19 coincides with a central axis of the second bearing holder 21. A second radial bearing 22 is held by the second bearing holder 21. The first radial bearing 20 and the second radial bearing 22 are disposed in the housing 10.

A first chamber forming recess 17b is formed in an outer surface of the second intermediate housing 17 opposite from the motor chamber 18. The first chamber forming recess 17b is in communication with the shaft insertion hole 17a. The second intermediate housing 17 has a plurality of communication holes 23. The communication holes 23 are positioned in a portion of the second intermediate housing 17 close to an outer periphery thereof. The communication holes 23 extend through the second intermediate housing 17. The communication holes 23 provide communication between the motor chamber 18 and the first chamber forming recess 17b.

The first intermediate housing 16 is connected to the second intermediate housing 17. The first intermediate housing 16 is connected to the second intermediate housing 17 so that an opening of the first chamber forming recess 17b is closed by the first intermediate housing 16. A thrust bearing accommodation chamber 25 is defined by the first intermediate housing 16 and the first chamber forming recess 17b of the second intermediate housing 17. A shaft insertion hole 16a having a circular hole shape is formed in a central portion of the first intermediate housing 16.

The first intermediate housing 16 has a plurality of communication holes 16b. The communication holes 16b are positioned in a portion of the first intermediate housing 16 close to an outer periphery thereof. The communication holes 16b extend through the first intermediate housing 16. A second chamber forming recess 16c is formed in an outer surface of the first intermediate housing 16 opposite from the thrust bearing accommodation chamber 25. The second chamber forming recess 16c is in communication with the shaft insertion hole 16a. The communication holes 16b provide communication between the thrust bearing accommodation chamber 25 and the second chamber forming recess 16c.

The first compressor housing 13 has a tubular shape and has a first inlet 24 having a circular hole shape. The first compressor housing 13 is connected to the first intermediate housing 16 in a state in which a central axis of the first inlet 24 coincide with a central axis of the shaft insertion hole 16a. The first inlet 24 is in communication with the second chamber forming recess 16c.

The partition wall 15 is connected to an end surface of the first compressor housing 13 opposite from the first intermediate housing 16. The partition wall 15 has a plate shape. A through hole 27 (FIG. 2) having a circular hole shape is formed in a central portion of the partition wall 15. The through hole 27 extends through the partition wall 15 in a thickness direction of the partition wall 15. The partition wall 15 is connected to the first compressor housing 13 in a state in which a central axis of the through hole 27 coincides with the central axis of the first inlet 24.

Figure 2:
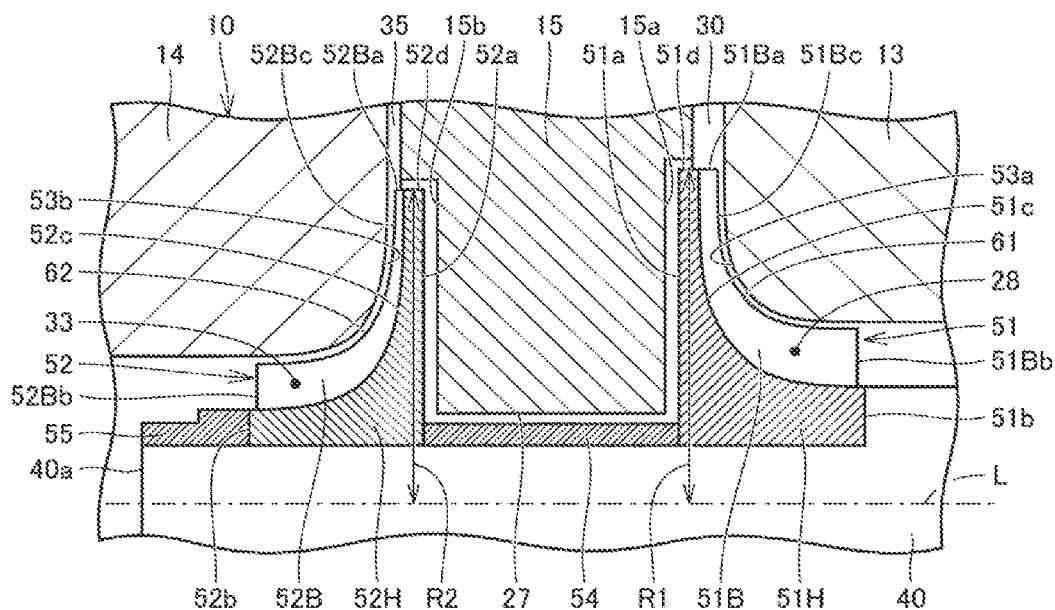
FIG. 2 is an enlarged cross-sectional view illustrating a vicinity of impellers.

FIG. 2 is an enlarged cross-sectional view illustrating a vicinity of impellers. As illustrated in FIGS. 1 and 2, a first impeller chamber 28 in communication with the first inlet 24, a first discharge chamber 29 extending around the central axis of the first inlet 24 around the first impeller chamber 28, a first diffuser passage 30 providing communication between the first impeller chamber 28 and the first discharge chamber 29 are formed between the partition wall 15 and the first compressor housing 13.

The second compressor housing 14 is connected to an end surface of the partition wall 15 opposite from the first compressor housing 13. An intermediate pressure chamber 31 is formed across the first compressor housing 13, the partition wall 15, and the second compressor housing 14. The intermediate pressure chamber 31 is in communication with the first discharge chamber 29 through a passage (not illustrated). The second compressor housing 14 has a second inlet 32 having a circular hole shape and in communication with the intermediate pressure chamber 31. The first discharge chamber 29 and the second inlet 32 are in communication with each other through the intermediate pressure chamber 31.

A second impeller chamber 33 in communication with the second inlet 32, a second discharge chamber 34 extending around the central axis of the second inlet 32 around the second impeller chamber 33, and a second diffuser passage 35 providing communication between the second impeller chamber 33 and the second discharge chamber 34 are formed between the partition wall 15 and the second compressor housing 14.

The housing 10 has the first impeller chamber 28 and the second impeller chamber 33. The first impeller chamber 28 and the second impeller chamber 33 are partitioned by the partition wall 15.

The rear housing 11 is connected to the second compressor housing 14. The rear housing 11 defines the intermediate pressure chamber 31. The rear housing 11 has a plate shape.

The electric turbo compressor 1 includes a rotary shaft 40. The rotary shaft 40 extends from an inside of the second bearing holder 21 and passes through the motor chamber 18, an inside of the first bearing holder 19, the shaft insertion hole 17a, the thrust bearing accommodation chamber 25, the shaft insertion hole 16a, the first inlet 24, the first impeller chamber 28, the through hole 27, the second impeller chamber 33, and the second inlet 32 in this order in an axial direction of the housing 10. The rotary shaft 40 is disposed across the first impeller chamber 28 and the second impeller chamber 33 with the rotary shaft 40 inserted through the through hole 27.

The rotary shaft 40 has a first end 40a and a second end 40b on one end and the other end, respectively, of the rotary shaft 40. The first end 40a is positioned in the second compressor housing 14. The second end 40b is positioned in the end wall 12a of the motor housing 12. The rotary shaft 40 is accommodated in the housing 10.

The rotary shaft 40 has an axis L that coincides with the central axes of the first bearing holder 19, the second bearing holder 21, the shaft insertion hole 17a, the shaft insertion hole 16a, the first inlet 24, the through hole 27, and the second inlet 32. In the following description, the "axial direction of the rotary shaft 40," which is a direction in which the axis L of the rotary shaft 40 extends, may be referred to as a "thrust direction" and a "radial direction of the rotary shaft 40" as a "radial direction.

The first radial bearing 20 and the second radial bearing 22 rotatably support the rotary shaft 40 in the radial direction. The first radial bearing 20 and the second radial bearing 22 each may be an aerodynamic bearing.

The electric turbo compressor 1 has a support plate 75 having a disk shape and formed on the rotary shaft 40. The support plate 75 protrudes radially outward from an outer peripheral surface of the rotary shaft 40. The support plate 75 rotates together with the rotary shaft 40. The support plate 75 is disposed in the thrust bearing accommodation chamber 25.

Thrust bearings 80 are disposed between the first intermediate housing 16 and the support plate 75, and between the second intermediate housing 17 and the support plate 75, respectively. Both of the thrust bearings 80 rotatably support the rotary shaft 40 in the thrust direction. The thrust bearings 80 each may be an aerodynamic bearing.

The electric turbo compressor 1 includes an electric motor 41. The electric motor 41 is accommodated in the motor chamber 18. The electric motor 41 is accommodated in the housing 10. The electric motor 41 is an example of a drive power source that drives the rotary shaft 40 to rotate. The electric motor 41 includes a stator 42 and a rotor 43.

The stator 42 includes a stator core 44 having a cylindrical shape, and a coil 45 wound around the stator core 44. The stator core 44 is fixed to the inner peripheral surface of the peripheral wall 12b of the motor housing 12.

The rotor 43 is positioned inside the stator core 44 in the radial direction in the motor chamber 18. The rotor 43 rotates together with the rotary shaft 40. The rotor 43 includes a rotor core 43a fixed to the rotary shaft 40, and a plurality of permanent magnets (not illustrated) disposed in the rotor core 43a. Electric power controlled by an inverter device (not illustrated) is supplied to the coil 45, which rotates the rotor 43 of the electric motor 41. The rotary shaft 40 rotates together with the rotor 43.

The electric turbo compressor 1 includes a first impeller 51 and a second impeller 52. The first impeller 51 is made of aluminum, for example. The second impeller 52 is made of resin, for example. The first impeller 51 and the second impeller 52 are connected to the rotary shaft 40. The first impeller 51 and the second impeller 52 rotate together with the rotary shaft 40.

The second impeller 52 is disposed closer to the first end 40a of the rotary shaft 40 than the first impeller 51 is. The first impeller 51 and the second impeller 52 are disposed on the first end 40a side of the rotary shaft 40 relative to the first radial bearing 20. The first impeller 51 is disposed closer to the electric motor 41 than the second impeller 52 is. The electric motor 41, the first impeller 51, and the second impeller 52 are arranged in this order in the axial direction of the rotary shaft 40. As illustrated in FIG. 2, the first impeller 51 is accommodated in the first impeller chamber 28. The second impeller 52 is accommodated in the second impeller chamber 33.

The first impeller 51 includes a first hub 51H. The first hub 51H is fixed to the rotary shaft 40. The first hub 51H has a trailing end surface 51a, a leading end surface 51b, an outer peripheral surface 51c, and a radial outer edge portion 51d. The trailing end surface 51a, the leading end surface 51b, the outer peripheral surface 51c, and the radial outer edge portion 51d form part of an outer surface of the first hub 51H. The first hub 51H has a substantially conical shape, the outer diameter of which increases from the leading end surface 51b positioned on the first inlet 24 side toward the trailing end surface 51a.

The trailing end surface 51a forms a rear end of the first hub 51H. The trailing end surface 51a forms part of the outer surface of the first hub 51H that does not form a refrigerant flow passage. In a state in which the first impeller 51 is connected to the rotary shaft 40 and the electric turbo compressor 1 is assembled, the trailing end surface 51a faces the partition wall 15 in the axial direction of the rotary shaft 40. The partition wall 15 has a first facing surface 15a that faces the trailing end surface 51a of the first hub 51H in the axial direction of the rotary shaft 40.

The leading end surface 51b forms a front end of the first hub 51H. The leading end surface 51b forms one end of the first impeller 51 in the axial direction of the rotary shaft 40. The leading end surface 51b corresponds to an end of the first hub 51H on a side on which refrigerant flows into the first impeller 51.

The outer peripheral surface (hub surface) 51c forms part of an inner wall surface of the first impeller chamber 28. The outer peripheral surface 51c is a curved surface concaved toward the axis L of the rotary shaft 40. At least a portion of the outer peripheral surface 51c faces outward in the radial direction of the rotary shaft 40. The outer peripheral surface 51c is formed so that the diameter of the outer peripheral surface 51c gradually increases from the leading end surface 51b to the trailing end surface 51a along the axial direction of the rotary shaft 40. The outer peripheral surface 51c is gradually inclined outward in the radial direction from the leading end surface 51b to the trailing end surface 51a.

The radial outer edge portion 51d is a portion of the first impeller 51 having the largest outer diameter. The radial outer edge portion 51d has a cylindrical shape with a short axis. The first impeller 51 has an outer diameter R1. The outer diameter R1 of the first impeller 51 corresponds to a distance between the axis L of the rotary shaft 40 and the radial outer edge portion 51d of the first impeller 51 in the radial direction of the rotary shaft 40.

The first impeller 51 has a plurality of first blades 51B. The plurality of first blades 51B are provided on the outer peripheral surface 51c of the first hub 51H. The plurality of first blades 51B are arranged in a circumferential direction of the first hub 51H. The plurality of first blades 51B divide the first impeller chamber 28 in the circumferential direction to form refrigerant flow passages between pairs of the first blades 51B disposed side by side in the circumferential direction. The first blades 51B projects radially outward from the outer peripheral surface 51c of the first hub 51H. The plurality of first blades 51B are arranged at equal intervals on the circumferential direction in the outer peripheral surface 51c of the first hub 51H. The distance between the first blades 51B disposed side by side in the circumferential direction of the first hub 51H increases from the front end to the rear end of the first hub 51H.

The first blades 51B each have a trailing end 51Ba, a leading end 51Bb, and an edge surface 51Bc. The trailing end 51Ba, the leading end 51Bb, and the edge surface 51Bc form part of the edge portion of each of the first blades 51B. The leading end 51Bb of each of the first blades 51B faces the first inlet 24. The trailing end 51Ba of each of the first blades 51B faces the first diffuser passage 30. The edge surface 51Bc of each of the first blades 51B faces the first compressor housing 13. The leading end 51Bb extends in the radial direction of the rotary shaft 40. The trailing end 51Ba extends in the axial direction of the rotary shaft 40.

The edge surface 51Bc is curved. The edge surface 51Bc is formed so that the diameter of the edge surface 51Bc gradually increases from the leading end 51Bb to the trailing end 51Ba along the axial direction of the rotary shaft 40. The edge surface 51Bc is gradually inclined outward in the radial direction from the leading end 51Bb to the trailing end 51Ba. The curvature of the edge surface 51Bc of each of the first blades 51B is larger than the curvature of the outer peripheral surface 51c of the first hub 51H.

The leading end 51Bb is an edge portion of each of the first blades 51B on an upstream side in a refrigerant flow direction. Refrigerant from the first inlet 24 flows into spaces between the pairs of the first blades 51B disposed side by side in the circumferential direction, via spaces between the leading ends 51Bb. The trailing end 51Ba is an edge portion of each of the first blades 51B on a downstream side in the refrigerant flow direction. The refrigerant flows radially outward via the spaces between pairs of the trailing ends 51Ba disposed side by side in the circumferential direction.

The second impeller 52 has a second hub 52H. The second hub 52H is fixed to the rotary shaft 40. The second hub 52H has a trailing end surface 52a, a leading end surface 52b, an outer peripheral surface 52c, and a radial outer edge portion 52d. The trailing end surface 52a, the leading end surface 52b, the outer peripheral surface 52c, and the radial outer edge portion 52d form part of an outer surface of the second hub 52H. The second hub 52H has a substantially conical shape, the outer diameter of which increases from the leading end surface 52b positioned on the second inlet 32 side toward the trailing end surface 52a.

The trailing end surface 52a forms a rear end of the second hub 52H. The trailing end surface 52a forms part of the outer surface of the second hub 52H that does not form the refrigerant flow passage. In a state in which the second impeller 52 is connected to the rotary shaft 40 and the electric turbo compressor 1 is assembled, the trailing end surface 52a faces the partition wall 15 in the axial direction of the rotary shaft 40. The partition wall 15 has a second facing surface 15b that faces the trailing end surface 52a of the second hub 52H in the axial direction of the rotary shaft 40.

The leading end surface 52b forms a front end of the second hub 52H. The leading end surface 52b forms one end of the second impeller 52 in the axial direction of the rotary shaft 40. The leading end surface 52b corresponds to an end of the second hub 52H on a side on which refrigerant flows into the second impeller 52.

The outer peripheral surface (hub surface) 52c forms part of an inner wall surface of the second impeller chamber 33. The outer peripheral surface 52c is a curved surface concaved toward the axis L of the rotary shaft 40. At least a portion of the outer peripheral surface 52c faces outward in the radial direction of the rotary shaft 40. The outer peripheral surface 52c is formed so that the diameter of the outer peripheral surface 52c gradually increases from the leading end surface 52b to the trailing end surface 52a along the axial direction of the rotary shaft 40. The outer peripheral surface 52c is gradually inclined outward in the radial direction from the leading end surface 52b toward the trailing end surface 52a.

The radial outer edge portion 52d is a portion of the second impeller 52 having the largest outer diameter. The radial outer edge portion 52d has a cylindrical shape with a short axis. The second impeller 52 has an outer diameter R2. The outer diameter R2 of the second impeller 52 corresponds to a distance between the axis L of the rotary shaft 40 and the radial outer edge portion 52d of the second impeller 52 in the radial direction of the rotary shaft 40.

The second impeller 52 has a plurality of second blades 52B. The plurality of second blades 52B are provided in the outer peripheral surface 52c of the second hub 52H. The plurality of second blades 52B are arranged in a circumferential direction of the second hub 52H. The plurality of second blades 52B divide the second impeller chamber 33 in the circumferential direction to form refrigerant flow passages between pairs of the second blades 52B disposed side by side in the circumferential direction. The second blades 52B project radially outward from the outer peripheral surface 52c of the second hub 52H. The plurality of second blades 52B are arranged at equal intervals in the circumferential direction on the outer peripheral surface 52c of the second hub 52H. A distance between the second blades 52B disposed side by side in the circumferential direction of the second hub 52H increases from the front end to the rear end of the second hub 52H.

The second blades 52B each have a trailing end 52Ba, a leading end 52Bb, and an edge surface 52Bc. The trailing end 52Ba, the leading end 52Bb, and the edge surface 52Bc form part of the edge portion of each of the second blades 52B. The leading end 52Bb of each of the second blades 52B faces the second inlet 32. The trailing end 52Ba of each of the second blades 52B faces the second diffuser passage 35. The edge surface 52Bc of each of the second blades 52B faces the second compressor housing 14. The leading end 52Bb extends in the radial direction of the rotary shaft 40. The trailing end 52Ba extends in the axial direction of the rotary shaft 40.

The edge surface 52Bc is curved. The edge surface 52Bc is formed so that the diameter of the edge surface 52Bc gradually increases from the leading end 52Bb to the trailing end 52Ba along the axial direction of the rotary shaft 40. The edge surface 52Bc is gradually inclined outward in the radial direction from the leading end 52Bb toward the trailing end 52Ba. The curvature of the edge surface 52Bc of each of the second blades 52B is larger than the curvature of the outer peripheral surface 52c of the second hub 52H.

The leading end 52Bb is an edge portion of each of the second blades 52B on an upstream side in the refrigerant flow direction. Refrigerant from the second inlet 32 flows into spaces between the pairs of the second blades 52B disposed side by side in the circumferential direction, via spaces between the leading ends 52Bb. The trailing end 52Ba is an edge portion of each of the second blades 52B on a downstream side in the refrigerant flow direction. The refrigerant flows radially outward through the spaces between pairs of the trailing ends 52Ba disposed side by side in the circumferential direction.

The electric motor 41 drives a rotating body including the rotary shaft 40, the first impeller 51, and the second impeller 52 to rotate, so that the rotating body rotates integrally around the axis L. The first impeller 51 rotates together with the rotary shaft 40 to compress refrigerant. The second impeller 52 rotates together with the rotary shaft 40 to compress the refrigerant having compressed by the first impeller 51. The first impeller 51 is disposed upstream, and the second impeller 52 is disposed downstream in the refrigerant flow direction.

The first impeller 51 and the second impeller 52 are disposed on the rotary shaft 40 so that the trailing end surface 51a of the first hub 51H and the trailing end surface 52a of the second hub 52H face each other across the partition wall 15. A spacer 54 having a hollow cylindrical shape is disposed between the first impeller 51 and the second impeller 52. The spacer 54 has a first end facing the trailing end surface 51a of the first hub 51H and a second end facing the trailing end surface 52a of the second hub 52H. A dimension of the spacer 54 in the axial direction of the rotary shaft 40 is slightly greater than a distance between the first facing surface 15a and the second facing surface 15b of the partition wall 15. The spacer 54 functions to seal a gap between the outer peripheral surface of the rotary shaft 40 and the inner peripheral surface of the through hole 27.

The rotary shaft 40 has a fitting member 55 mounted to the outer peripheral surface of the rotary shaft 40 in the first end 40a. The fitting member 55 has a hollow tubular shape. The fitting member 55 is mounted to the rotary shaft 40 by way of screwing, for example. The fitting member 55 is in contact with the leading end surface 52b of the second hub 52H. The fitting member 55 supports the second impeller 52 in the axial direction of the rotary shaft 40.

The first compressor housing 13 has a first shroud 53a that cooperates with the partition wall 15 to define the first impeller chamber 28. The first shroud 53a has a truncated conical shape, which covers the first impeller 51 from an outer side in the radial direction. The first shroud 53a faces the outer peripheral surface 51c of the first hub 51H. The first shroud 53a extends along the outer peripheral surface 51c of the first hub 51H from the trailing end surface 51a to the leading end surface 51b of the first hub 51H. The first shroud 53a surrounds the plurality of first blades 51B. The first shroud 53a faces the edge surfaces 51Bc of the first blades 51B and forms part of the inner wall surface of the first impeller chamber 28. The pairs of the first blades 51B disposed side by side in the circumferential direction of the first hub 51H, the first hub 51H, and the first shroud 53A form refrigerant flow passages extending radially.

A first tip clearance 61 is formed between the first impeller 51 and the first shroud 53a. The first tip clearance 61 is a gap extending between the edge surfaces 51Bc of the first blades 51B and the first shroud 53a of the first compressor housing 13 from the leading ends 51Bb to the trailing ends 51Ba of the first blades 51B.

The second compressor housing 14 has a second shroud 53b that cooperates with the partition wall 15 to define the second impeller chamber 33. The second shroud 53b has a truncated conical shape, which covers the second impeller 52 from an outer side in the radial direction. The second shroud 53b faces the outer peripheral surface 52c of the second hub 52H. The second shroud 53b extends along the outer peripheral surface 52c of the second hub 52H from the trailing end surface 52a to the leading end surface 52b of the second hub 52H. The second shroud 53b surrounds the plurality of second blades 52B. The second shroud 53b faces the edge surfaces 52Bc of the second blades 52B and forms part of the inner wall surface of the second impeller chamber 33. The pairs of the second blades 52B disposed side by side in the circumferential direction of the second hub 52H, the second hub 52H, and the second shroud 53B form refrigerant flow passages extending radially.

A second tip clearance 62 is formed between the second impeller 52 and the second shroud 53b. The second tip clearance 62 is a gap extending between the edge surfaces 52Bc of the second blades 52B and the second shroud 53B of the second compressor housing 14 from the leading ends 52Bb to the trailing ends 52Ba of the second blades 52B.

Figure 3:
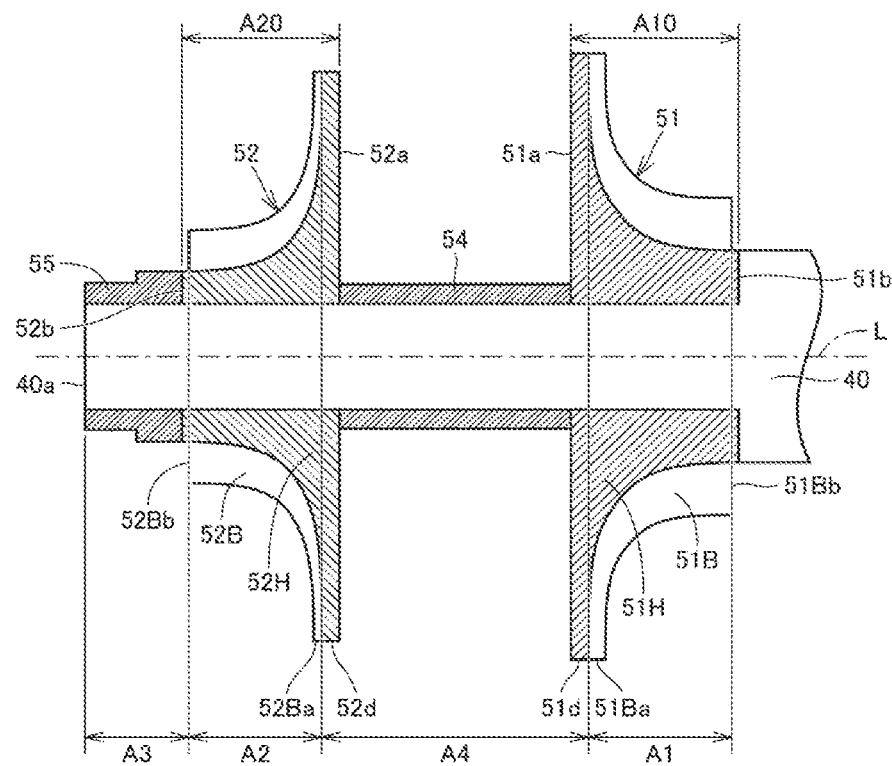
FIG. 3 is a cross-sectional view for describing parts set in a rotating body.

FIG. 3 is a cross-sectional view for describing parts set in the rotating body. As illustrated in FIG. 3, in the rotating body including the rotary shaft 40, the first impeller 51, and the second impeller 52, part of the rotating body from the leading end 51Bb to the trailing end 51Ba of the first blades 51B along the axial direction of the rotary shaft 40 is set as a first part A1. In the rotating body, part the rotating body from the leading ends 52Bb to the trailing ends 52Ba of the second blades 52B along the axial direction of the rotary shaft 40 is set a second part A2. In the rotating body, part of the rotating body from the second blades 52B to one of a pair of ends of the rotary shaft 40 on a side on which the second impeller 52 is disposed, i.e., the first end 40a, along the axial direction of the rotary shaft 40 is set as a third part A3. The first end 40a is one of the pair of ends of the rotary shaft 40 opposite from the electric motor 41 with respect to the first impeller 51 and the second impeller 52.

In the rotating body, part of the rotating body from the first blades 51B to the second blades 52B along the axial direction of the rotary shaft is set as a fourth part A4. In the rotating body, part of the rotating body from the trailing end surface 51*a* to the leading end surface 51*b* of the first hub 51H along the axial direction of the rotary shaft 40 is set as a first extended part A10. In the rotating body, part of the rotating body from the trailing end surface 52*a* to the leading end surface 52*b* of the second hub 52H along the axial direction of the rotary shaft 40 is set as a second extended part A20.

In the electric turbo compressor 1 of the embodiment, mass of the first part A1 of the rotating body is greater than mass of the second part A2 of the rotating body. The mass of the first part A1 includes mass of the rotary shaft 40 and mass of the first impeller 51, i.e., mass of the first hub 51H and mass of the first blades 51B. The mass of the second part A2 includes the mass of the rotary shaft 40 and mass of the second impeller 52, i.e., mass of the second hub 52H and mass of the second blades 52B.

In the electric turbo compressor 1 of the embodiment, mass of the first extended part A10 of the rotating body is greater than mass of the second extended part A20 of the rotating body. The mass of the first extended part A10 includes the mass of the rotary shaft 40 and the mass of the first impeller 51 i.e., the mass of the first hub 51H and the mass of the first blades 51B. The mass of the second extended part A20 includes the mass of the rotary shaft 40 and the mass of the second impeller 52, i.e., the mass of the second hub 52H and the mass of the second blades 52B.

In the electric turbo compressor 1 of the embodiment, the mass of the first impeller 51 alone is greater than the mass of the second impeller 52 alone. As illustrated in FIG. 2, the outer diameter R1 of the first impeller 51 is greater than the outer diameter R2 of the second impeller 52. An overall length of the first impeller 51 along the axial direction is greater than an overall length the second impeller 52 along the axial direction. Specific gravity of the material of the first impeller 51 is greater than specific gravity of the material of the second impeller 52. The rotary shaft 40 has a uniform outer diameter over the part from the leading ends 51Bb of the first blades 51B to the first end 40*a*.

In the electric turbo compressor 1 of the embodiment, the mass of the second part A2 of the rotating body is greater than mass of the third part A3 of the rotating body. The mass of the third part A3 includes the mass of the rotary shaft 40 and mass of the fitting member 55. In an example illustrated in FIG. 3, the mass of the third part A3 includes the mass of the second hub 52H.

In the electric turbo compressor 1 of the embodiment, the mass of the first part A1 of the rotating body is greater than mass of the fourth part A4 of the rotating body. The mass of the fourth part A4 includes the mass of the rotary shaft 40, mass of the spacer 54, the mass of the first hub 51H, and mass of the second hub 52H.

In the electric turbo compressor 1, refrigerant is drawn into the motor chamber 18 through an inlet hole (not illustrated). The refrigerant drawn into the motor chamber 18 passes through the communication holes 23, the thrust bearing accommodation chamber 25, the communication holes 16*b*, and the inside of the second chamber forming recess 16*c*, and is drawn into the first inlet 24. The refrigerant drawn into the first inlet 24 is pressurized by the centrifugal action of the first impeller 51, and is fed from the first impeller chamber 28 into the first diffuser passage 30 in which the refrigerant is further pressurized. The refrigerant having passed through the first diffuser passage 30 is discharged to the first discharge chamber 29.

The refrigerant discharged to the first discharge chamber 29 passes through the intermediate pressure chamber 31, and is drawn into the second inlet 32. The refrigerant drawn into the second inlet 32 is pressurized by the centrifugal action of the second impeller 52, and is fed from the second impeller chamber 33 into the second diffuser passage 35 in which the refrigerant is further pressurized. The refrigerant having passed through the second diffuser passage 35 is discharged to the second discharge chamber 34. The second discharge chamber 34 is in communication with a discharge port (not illustrated). The refrigerant compressed by the electric turbo compressor 1 is discharged from the discharge port to an outside of the electric turbo compressor 1.

In the above-described embodiment of the electric turbo compressor 1, in the rotating body including the rotary shaft 40, the first impeller 51, and the second impeller 52, the mass of the part of the rotating body from the leading ends 51Bb to the trailing ends 51Ba of the first blades 51B along the axial direction is greater than the mass of the part of the rotating body from the leading ends 52Bb to the trailing ends 52Ba of the second blades 52B along the axial direction.

The second impeller 52 is disposed closer to the first end 40*a* of the rotary shaft 40 than the first impeller 51 is. The second impeller 52 disposed on the tip end side of the rotary shaft 40 may have greater runout than the first impeller 51 does during operation. By setting the mass of the second part A2 smaller than that of the first part A1 as illustrated in FIG. 3, the amount of the runout of the second impeller 52 may be reduced, which may prevent the second impeller 52 from being brought into contact with the second compressor housing 14. Therefore, the reliability of the electric turbo compressor 1 may be improved.

Since the amount of the runout of the second impeller 52 may be reduced, the second tip clearance 62 may be reduced. The amount of the runout of the first impeller 51 is reduced along with the reduction of the amount of runout of the second impeller 52, so that the first tip clearance 61 may be reduced. Reducing the tip clearances may suppress turbulence in a flow of the refrigerant flowing through the first impeller chamber 28 and the second impeller chamber 33. Therefore, the electric turbo compressor 1 of the embodiment may perform efficient two-stage compression.

In the rotating body including the rotary shaft 40, the first impeller 51, and the second impeller 52, the mass of the part of the rotating body from the trailing end surface 51*a* to the leading end surface 51*b* of the first hub 51H along the axial direction is greater than the mass of the part of the rotating body from the trailing end surface 52*a* to the leading end surface 52*b* of the second hub 52H along the axial direction. By setting the mass of the second extended part A20 smaller than the mass of the first extended part A10 as illustrated in FIG. 3, the amount of the runout of the second impeller 52 may be reliably reduced.

By setting the mass of the first impeller 51 alone larger than the mass of the second impeller 52 alone, the mass of the first part A1 may be easily made larger than the mass of the second part A2, and the mass of the first extended part A10 may be easily made larger than the mass of the second extended part A20.

As illustrated in FIG. 2, by setting the outer diameter R1 of the first impeller 51 larger than the outer diameter R2 of the second impeller 52, the mass of the first part A1 in FIG. 3 may be easily made larger than the mass of the second part A2, so that the mass of the first extended part A10 may be easily made larger than) the mass of the second extended part A20.

As illustrated in FIG. 3, by setting the overall length of the first impeller 51 along the axial direction greater than the overall length of the second impeller 52 along the axial direction, the mass of the first part A1 of the rotating body may be easily made greater than the mass of the second part A2 of the rotating body, so that the mass of the first extended part A10 may be easily made greater than the mass of the second extended part A20.

By setting the specific gravity of the material of the first impeller 51 greater than the specific gravity of the material of the second impeller 52, the mass of the first part A1 may be easily made greater than the mass of the second part A2, so that the mass of the first extended part A10 may be easily made greater than the mass of the second extended part A20.

In the rotating body including the rotary shaft 40, the first impeller 51, and the second impeller 52, the mass of the part of the rotating body from the leading ends 52Bb to the trailing ends 52Ba of the second blades 52B along the axial direction is greater than the mass of the part of the rotating body from the second blades 52B to the first end 40a, which is the end of the rotary shaft 40 on a side on which the second impeller 52 is disposed. By setting the mass of the third part A3 smaller than the mass of the second part A2 as illustrated in FIG. 3, the amount of the runout of the rotating body may be further reduced.

In the rotating body including the rotary shaft 40, the first impeller 51, and the second impeller 52, the mass of the part of the rotating body from the leading ends 51Bb to the trailing ends 51Ba of the first blades 51B along the axial direction is greater than the mass of the part of the rotating body from the first blades 51B to the second blades 52B along the axial direction. By setting the mass of the fourth part A4 smaller than that of the first part A1 as illustrated in FIG. 3, the amount of the runout of the rotating body may be further reduced.

Figure 4:
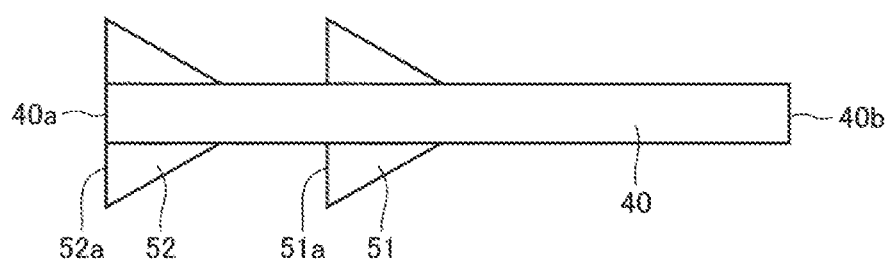
FIG. 4 is a schematic view schematically illustrating a modified example of an arrangement of impellers.

In the above description of the embodiment, an example of an arrangement in which the trailing end surface 51a of the first hub 51H of the first impeller 51 and the trailing end surface 52a of the second hub 52H of the second impeller 52 face each other with the partition wall 15 interposed therebetween has been described. The arrangement of the first impeller 51 and the second impeller 52 is not limited to this example. FIG. 4 is a schematic view schematically illustrating a modified example of an arrangement of the impellers. As illustrated in FIG. 4, the first impeller 51 and the second impeller 52 may be arranged so that the leading end surfaces 51b, 52b face the second end 40b of the rotary shaft 40 and the trailing end surfaces 51a, 52a face the first end 40a of the rotary shaft 40. In this case, the second impeller 52 is also disposed closer to the first end 40a of the rotary shaft 40, and the mass of the part of the rotating body from the leading ends 51Bb to the trailing ends 51Ba of the first blades 51B along the axial direction is set greater than the mass of the part of the rotating body from the leading ends 52Bb to the trailing ends 52Ba of the second blades 52B along the axial direction. As a result, the amount of the runout of the second impeller 52 may be reduced, so that the reliability of the electric turbo compressor 1 may be improved.

In the above-described embodiment, an example of the embodiment in which the rotary shaft 40, the first impeller 51, and the second impeller 52 are provided as separate members has been described. The rotary shaft 40 and the first impeller 51 may be formed integrally. The rotary shaft 40 and the second impeller 52 may be formed integrally. In addition, although the first impeller 51, the second impeller 52, and the spacer 54 are provided as separate members in the above-described embodiment, either the first impeller 51 or the second impeller 52 and the spacer 54 may be formed integrally.

Although the fitting member 55 is in contact with the leading end surface 52b of the second hub 52H and the entire fitting member 55 is positioned in the third part A3 in the above-described embodiment, part of the fitting member 55 may be positioned in the second part A2.

Although the electric turbo compressor 1 described in the embodiment is a centrifugal compressor, the technical idea of the present disclosure is also applicable to a diagonal flow type compressor.

Although the description of the embodiment has been provided as above, the embodiment disclosed herein is an example in all respects, and should not be considered restrictive. The scope of the present disclosure shall be defined not by the description but by the claims, and is intended to include embodiments equivalent to the scope of the claims and all modifications within the scope.

REFERENCE SIGNS LIST 1 electric turbo compressor
10 housing
11 rear housing
13 first compressor housing
14 second compressor housing
15 partition wall
15a first facing surface
15b second facing surface
24 first inlet
27 through hole
28 first impeller chamber
29 first discharge chamber
30 first diffuser passage
31 intermediate pressure chamber
32 second inlet
33 second impeller chamber
34 second discharge chamber
35 second diffuser passage
40 rotary shaft
40a first end
40b second end
41 electric motor
51 first impeller
51B first blade
51Ba, 52Ba trailing end
51Bb, 52Bb leading end
51Bc, edge surface
51H first hub
51a, 52a trailing end surface
51b, 52b leading end surface
51c, 52c outer peripheral surface
51d, 52d radial outer edge portion
52 second impeller
52B second blade
52H second hub
53a first shroud
53b second shroud
54 spacer
55 fitting member
61 first tip clearance
62 second tip clearance
L axis
R1, R2 outer diameter

The invention claimed is:

1. An electric turbo compressor comprising:
a housing;
an electric motor accommodated in the housing; and
a rotating body accommodated in the housing, and driven to rotate by the electric motor;
the rotating body including:
a rotary shaft having one end and the other end, and configured to rotate together with the electric motor;
a first impeller disposed on the one end side of the rotary shaft, and configured to rotate together with the rotary shaft; and
a second impeller disposed on the one end side of the rotary shaft, and configured to rotate together with the rotary shaft, wherein
the electric motor, the first impeller, and the second impeller are arranged in this order in an axial direction of the rotary shaft,
the rotary shaft is rotatably supported by a radial bearing and a thrust bearing,
the radial bearing and the thrust bearing are disposed on the other end side of the rotary shaft relative to the first impeller,
the first impeller rotates to compress gas,
the second impeller rotates to compress the gas compressed by the first impeller,
the first impeller includes a first hub fixed to the rotary shaft, and a plurality of first blades arranged on the first hub,
the second impeller includes a second hub fixed to the rotary shaft, and a plurality of second blades arranged on the second hub, and
in the rotating body, mass of part of the rotating body from one ends of the first blades to the other ends of the first blades along the axial direction is greater than mass of part of the rotating body from one ends of the second blades to the other ends of the second blades along the axial direction.

2. The electric turbo compressor according to claim 1, wherein in the rotating body, mass of part of the rotating body from one end of the first hub to the other end of the first hub along the axial direction is greater than mass of part of the rotating body from one end of the second hub to the other end of the second hub along the axial direction.

3. The electric turbo compressor according to claim 1, wherein mass of the first impeller is greater than mass of the second impeller.

4. The electric turbo compressor according to claim 1, wherein an outer diameter of the first impeller is greater than an outer diameter of the second impeller.

5. The electric turbo compressor according to claim 1, wherein an overall length of the first impeller along the axial direction is greater than an overall length of the second impeller along the axial direction.

6. The electric turbo compressor according to claim 1, wherein specific gravity of a material of the first impeller is greater than specific gravity of a material of the second impeller.

7. The electric turbo compressor according to claim 1, wherein, in the rotating body, the mass of the part of the rotating body from the one ends of the second blades to the other ends of the second blades along the axial direction is greater than mass of part of the rotating body from the second blades to one end of the rotary shaft on a side on which the second impeller is disposed.

8. The electric turbo compressor according to a claim 1, wherein, in the rotating body, the mass of the part of the rotating body from the one ends of the first blades to the other ends of the first blades along the axial direction is greater than mass of part of the rotating body from the first blades to the second blades along the axial direction.

* * * * *